United States Patent
Shinners

(10) Patent No.: US 10,460,072 B2
(45) Date of Patent: Oct. 29, 2019

(54) APPARATUSES AND METHODS FOR MODELING TUBING RUNS

(71) Applicant: THE BOEING COMPANY, Chicago, IL (US)

(72) Inventor: Michael John Shinners, Algona, WA (US)

(73) Assignee: The Boeing Company, Chicago, IL (US)

( * ) Notice: Subject to any disclaimer, the term of this patent is extended or adjusted under 35 U.S.C. 154(b) by 1023 days.

(21) Appl. No.: 14/835,074

(22) Filed: Aug. 25, 2015

(65) Prior Publication Data

US 2017/0061035 A1 Mar. 2, 2017

(51) Int. Cl.
*F16C 11/06* (2006.01)
*G06F 17/50* (2006.01)

(52) U.S. Cl.
CPC ...... *G06F 17/5095* (2013.01); *F16C 11/0695* (2013.01); *G06F 2217/34* (2013.01); *Y10T 403/32032* (2015.01); *Y10T 403/32311* (2015.01); *Y10T 403/32754* (2015.01)

(58) Field of Classification Search
CPC combination set(s) only.
See application file for complete search history.

(56) References Cited

U.S. PATENT DOCUMENTS

| 538,534 | A | * | 4/1895 | O'Neill | A47B 23/046 108/8 |
|---|---|---|---|---|---|
| 1,460,697 | A | * | 7/1923 | Bendlin | A47B 27/06 138/120 |
| 1,528,967 | A | * | 3/1925 | Bersted | F16N 21/00 138/120 |
| 2,670,228 | A | * | 2/1954 | Pagliuso | F16M 11/14 248/177.1 |
| 3,638,973 | A | * | 2/1972 | Poletti | A61B 17/02 137/583 |
| 4,673,376 | A | * | 6/1987 | Fender | F16C 11/06 403/290 |
| 4,947,666 | A | | 8/1990 | Hametner et al. | |
| 5,707,073 | A | * | 1/1998 | Stuker | B60G 21/0551 280/124.125 |
| 5,768,149 | A | | 6/1998 | Umney et al. | |

(Continued)

*Primary Examiner* — Matthew R McMahon
(74) *Attorney, Agent, or Firm* — Joseph F. Harding; The Small Patent Law Group, LLC

(57) ABSTRACT

A modeling assembly (100) for layout of rigid tubing comprises a first releasable coupling assembly (110) and a second releasable coupling assembly (120). The modeling assembly (100) also comprises a lockable adjustment assembly (130) comprising a first component (140) and a second component (150). The first component (140) is configured to be removably coupled to an end A of a first rigid tube (102) via the first releasable coupling assembly (110). The second component (150) is configured to be removably coupled to an end C of a second rigid tube (104) via the second releasable coupling assembly (120). With the lockable adjustment assembly (130) in the loose coupled state, the first component (140) and the second component (150) have only three degrees of freedom relative to each other. With the lockable adjustment assembly (130) in the locked coupled state, the first component (140) and the second component (150) have zero degrees of freedom relative to each other.

19 Claims, 9 Drawing Sheets

(56) References Cited

U.S. PATENT DOCUMENTS

| | | | |
|---|---|---|---|
| 5,897,417 A * | 4/1999 | Grey | A63H 33/062 |
| | | | 403/340 |
| 6,076,840 A * | 6/2000 | Kincaid | F16F 1/3842 |
| | | | 267/188 |
| 6,220,556 B1 * | 4/2001 | Sohrt | F16C 11/106 |
| | | | 248/278.1 |
| 6,581,892 B2 * | 6/2003 | Carnevali | F16C 11/0604 |
| | | | 248/181.1 |
| 6,767,153 B1 * | 7/2004 | Holbrook | F16C 11/0604 |
| | | | 403/115 |
| 7,059,851 B2 * | 6/2006 | Kim | A61C 11/02 |
| | | | 433/60 |
| 7,090,181 B2 * | 8/2006 | Biba | F16C 11/106 |
| | | | 248/288.31 |
| 7,305,274 B2 | 12/2007 | Greer et al. | |
| 8,979,050 B2 * | 3/2015 | Yu | A47C 3/28 |
| | | | 248/181.1 |
| 2003/0146936 A1 | 8/2003 | Greer et al. | |
| 2008/0228454 A1 | 9/2008 | Laudrain et al. | |
| 2016/0201707 A1 * | 7/2016 | Wood | F16B 35/06 |
| | | | 403/267 |
| 2017/0027422 A1 * | 2/2017 | Khanicheh | A61B 1/00149 |

\* cited by examiner

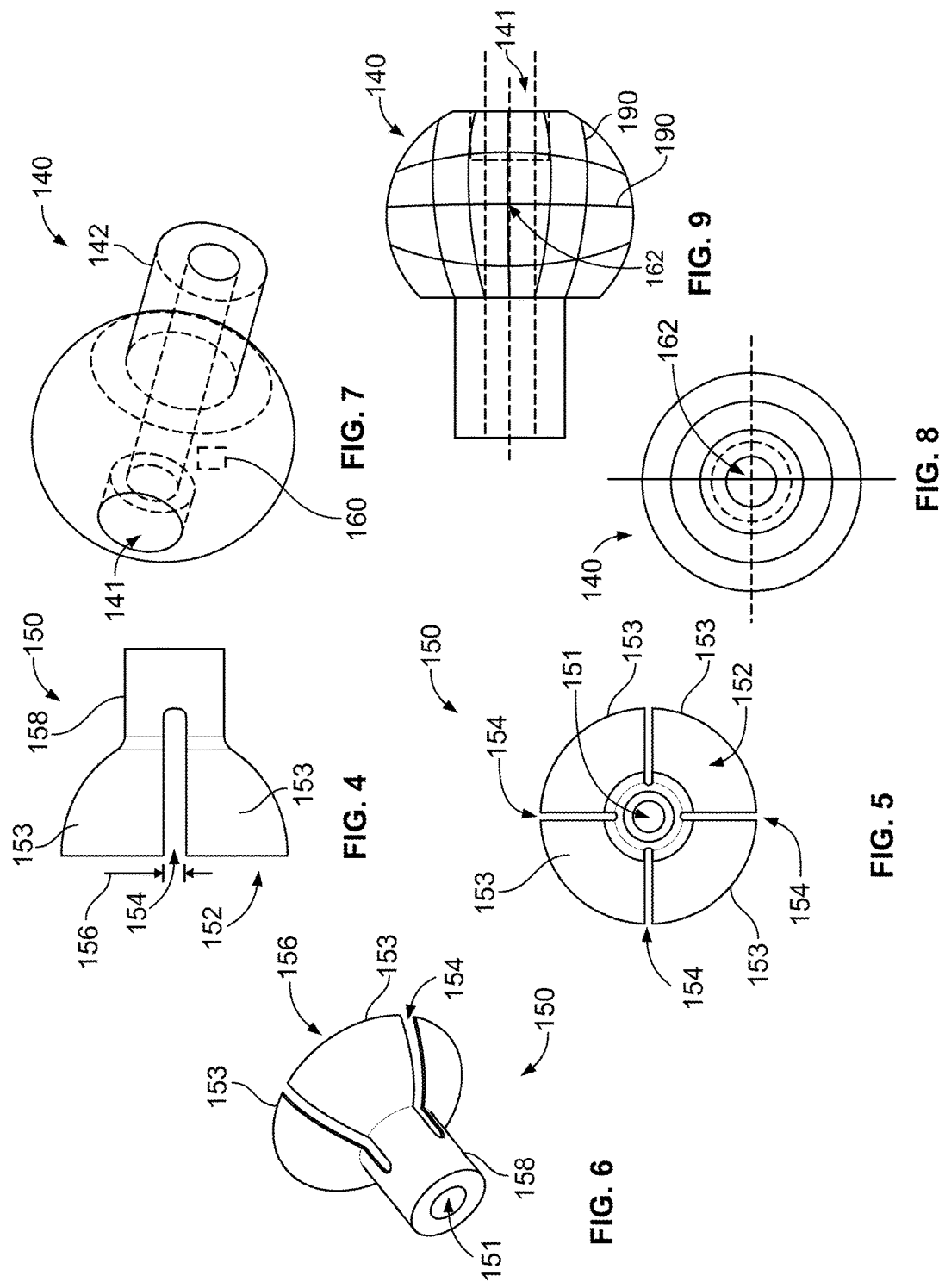

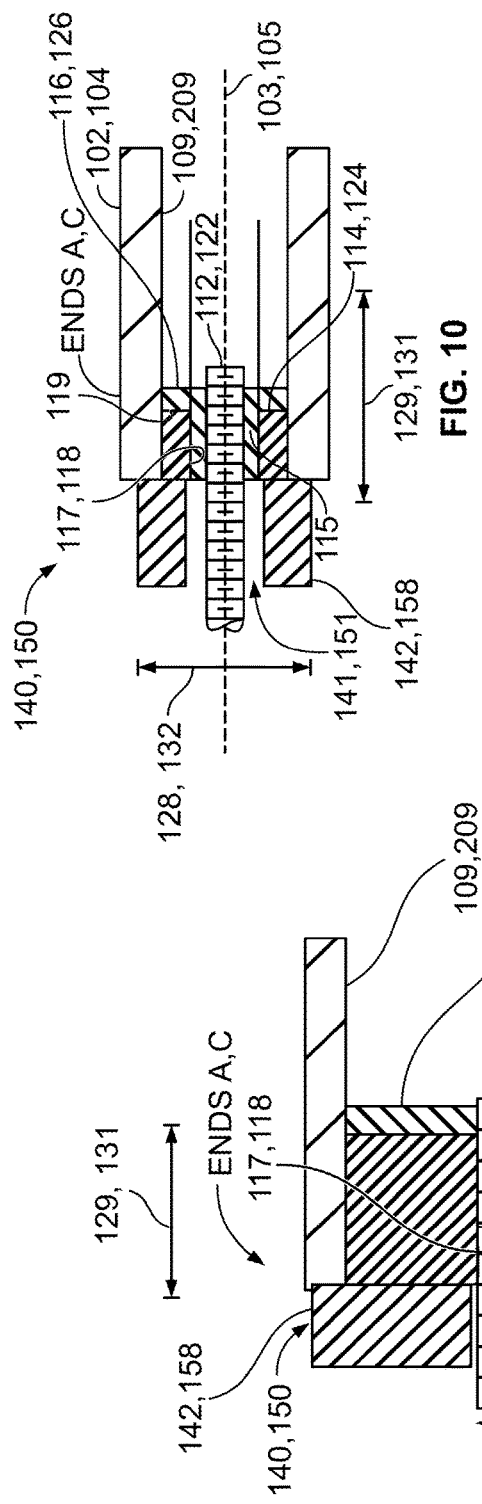
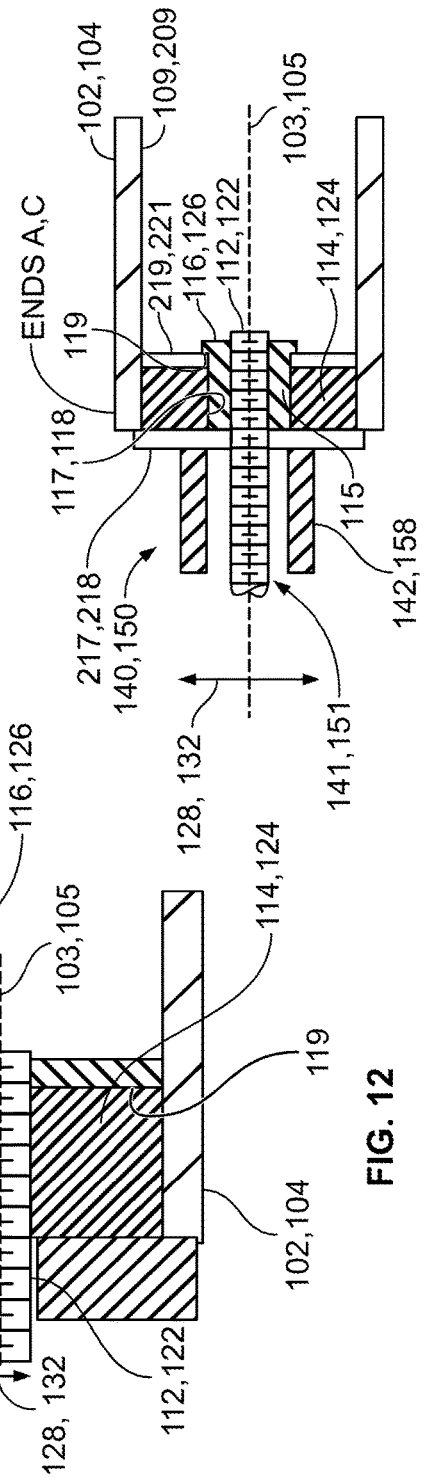
FIG. 10
FIG. 11
FIG. 12

APPARATUSES AND METHODS FOR MODELING TUBING RUNS

BACKGROUND

Tubing runs (e.g., for wires) may need be installed in locations having various structures around which the tube must be bent, requiring complex shapes and/or multiple bends in the tubing run. Use of flexible pipe to model a tubing run may result in irregularities in the various portions of the flexible pipe, resulting in inaccuracy, possibly causing the tubing run, manufactured based on the flexible-pipe model, to be out of specification.

SUMMARY

Accordingly, apparatuses and methods, intended to address at least the above-identified concerns, would find utility.

The following is a non-exhaustive list of examples, which may or may not be claimed, of the subject matter according the present disclosure.

One example of the present disclosure relates to a modeling assembly for layout of rigid tubing. The modeling assembly comprises a first releasable coupling assembly and a second releasable coupling assembly. The modeling assembly also comprises a lockable adjustment assembly, comprising a first component and a second component. The first component of the lockable adjustment assembly is configured to be removably coupled to an end A of a first rigid tube, having a first longitudinal axis, via the first releasable coupling assembly. The second component of the lockable adjustment assembly is configured to be removably coupled to an end C of a second rigid tube, having a second longitudinal axis, via the second releasable coupling assembly. The lockable adjustment assembly is selectively configured to a loose coupled state or a locked coupled state. With the lockable adjustment assembly in the loose coupled state, the first component of the lockable adjustment assembly and the second component of the lockable adjustment assembly have only three degrees of freedom relative to each other. With the lockable adjustment assembly in the locked coupled state, the first component of the lockable adjustment assembly and the second component of the lockable adjustment assembly have zero degrees of freedom relative to each other.

Another example of the present disclosure relates to a method of modeling layout of rigid tubing. The method comprises securing a first component of a lockable adjustment assembly to an end A of a first rigid tube via a first releasable coupling assembly. The method also comprises securing a second component of the lockable adjustment assembly to an end C of a second rigid tube via a second releasable coupling assembly. Additionally, the method comprises moving the first component and the second component, loosely coupled with each other, relative to each other with only three degrees of freedom to position the first rigid tube and the second rigid tube in a selected orientation with respect to each other within an installation volume. The method further comprises, with the first rigid tube and the second rigid tube in the selected orientation relative to each other, locking the lockable adjustment assembly so that the first component and the second component have zero degrees of freedom relative to each other.

Yet another example of the present disclosure relates to a modeling assembly for layout of rigid tubing. The modeling assembly comprises first rigid tubes, each having an end A and an end B, and second rigid tubes, each having an end C and an end D. The modeling assembly also comprises first releasable coupling assemblies and second releasable coupling assemblies. Additionally, the modeling assembly comprises lockable adjustment assemblies each comprising a first component and a second component. The first component of each one of the lockable adjustment assemblies is configured to be removably coupled to the end A or the end B of one of the first rigid tubes via one of the first releasable coupling assemblies. The second component of each one of the lockable adjustment assemblies is configured to be removably coupled to one of the end C or the end D of one of the second rigid tubes via one of the second releasable coupling assemblies. Each one of the lockable adjustment assemblies is selectively configured to a loose coupled state or a locked coupled state. With one of the lockable adjustment assemblies in the loose coupled state, the first component of the one of the lockable adjustment assemblies and the second component of the one of the lockable adjustment assemblies have only three degrees of freedom relative to each other. With one of the lockable adjustment assemblies in the locked coupled state, the first component of the one of the lockable adjustment assemblies and the second component of the one of the lockable adjustment assemblies have zero degrees of freedom relative to each other.

BRIEF DESCRIPTION OF THE DRAWINGS

Figure 1:
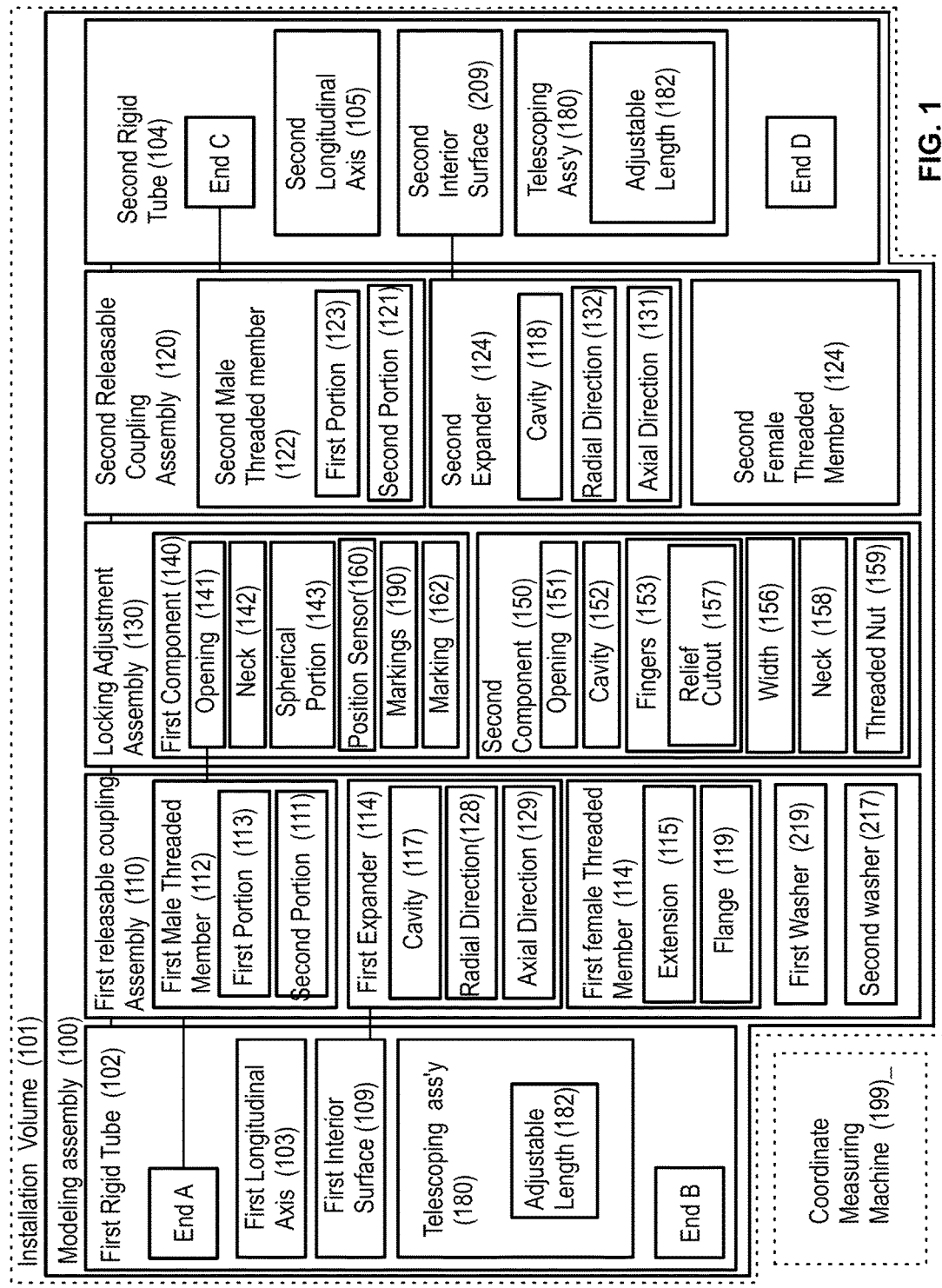
Figure 2:
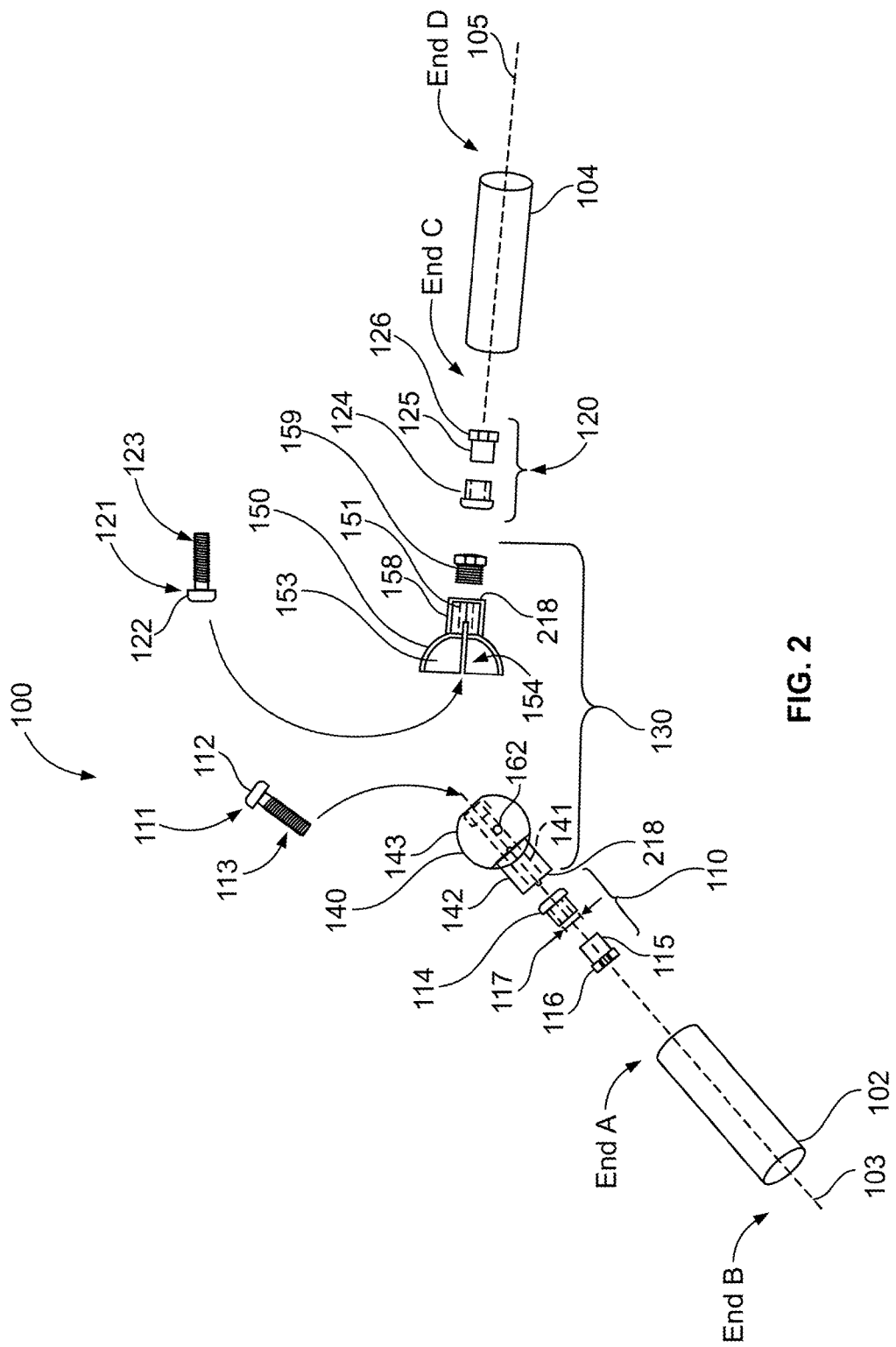
Figure 3:
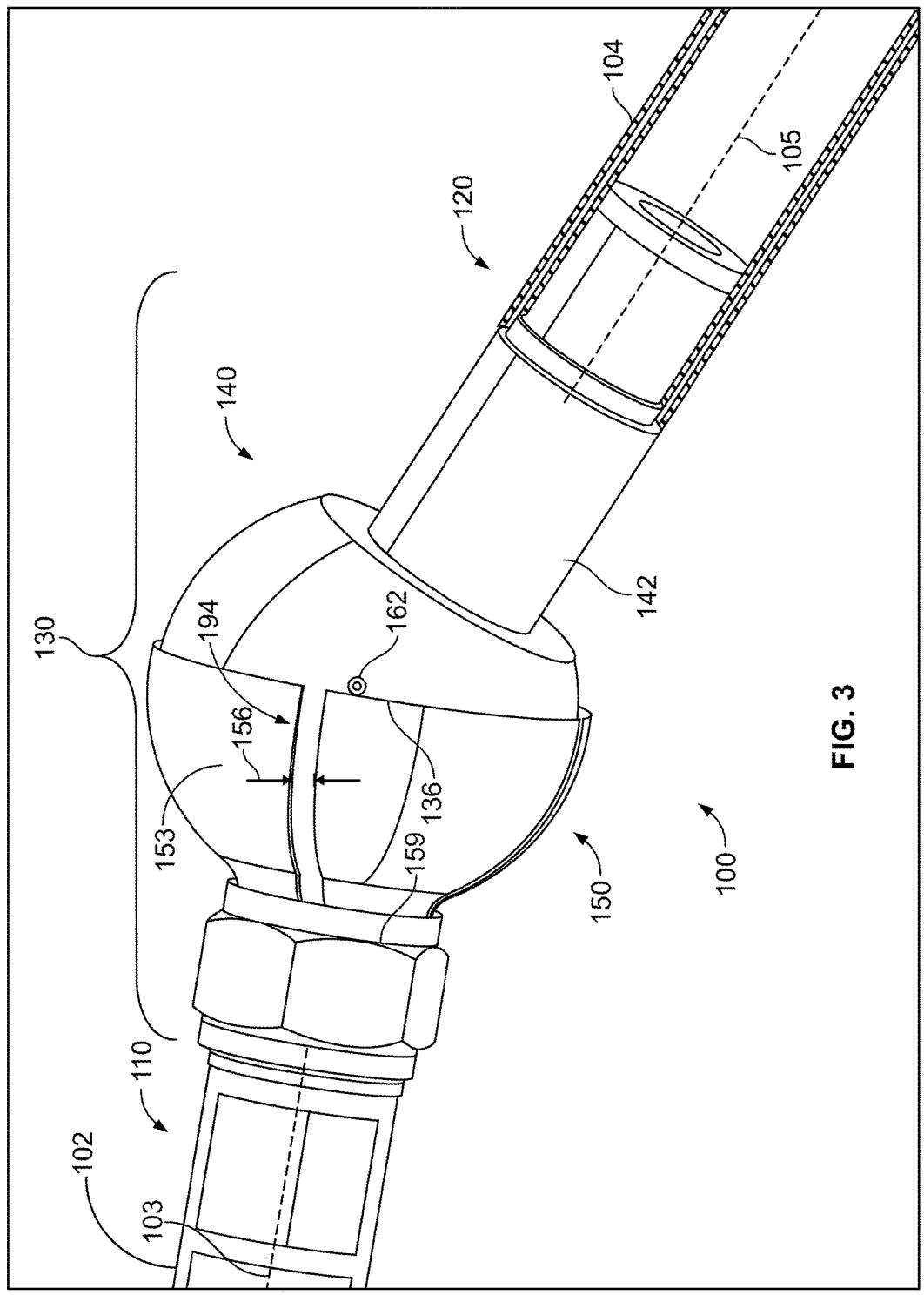
Figure 14:
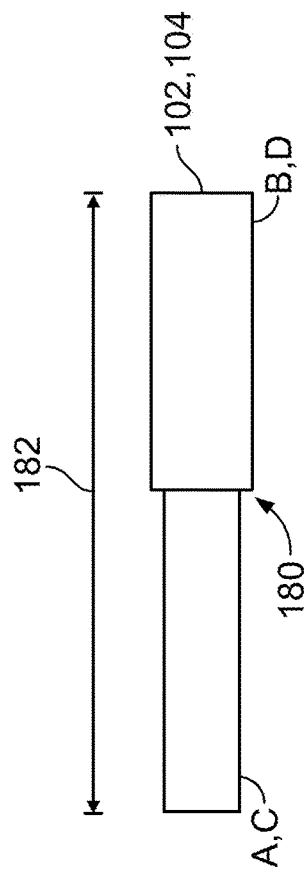
Figure 15:
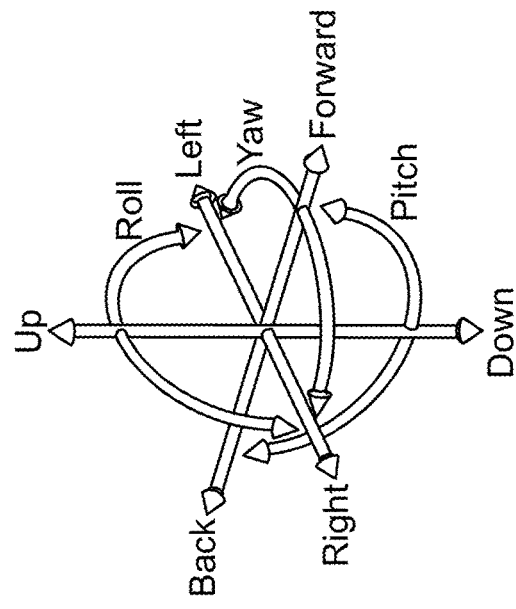
Figure 13:
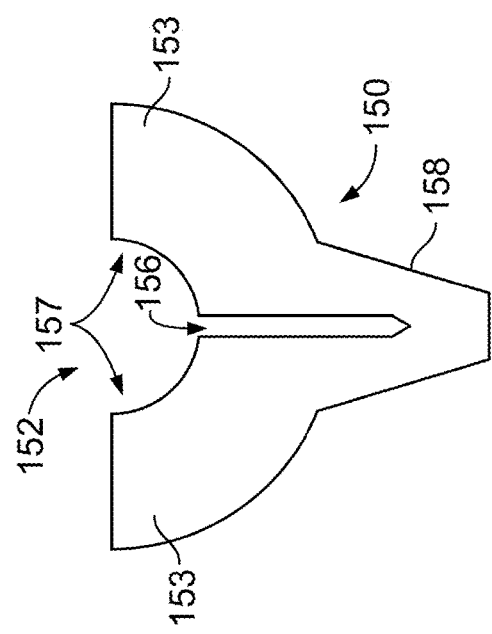
Figure 16:
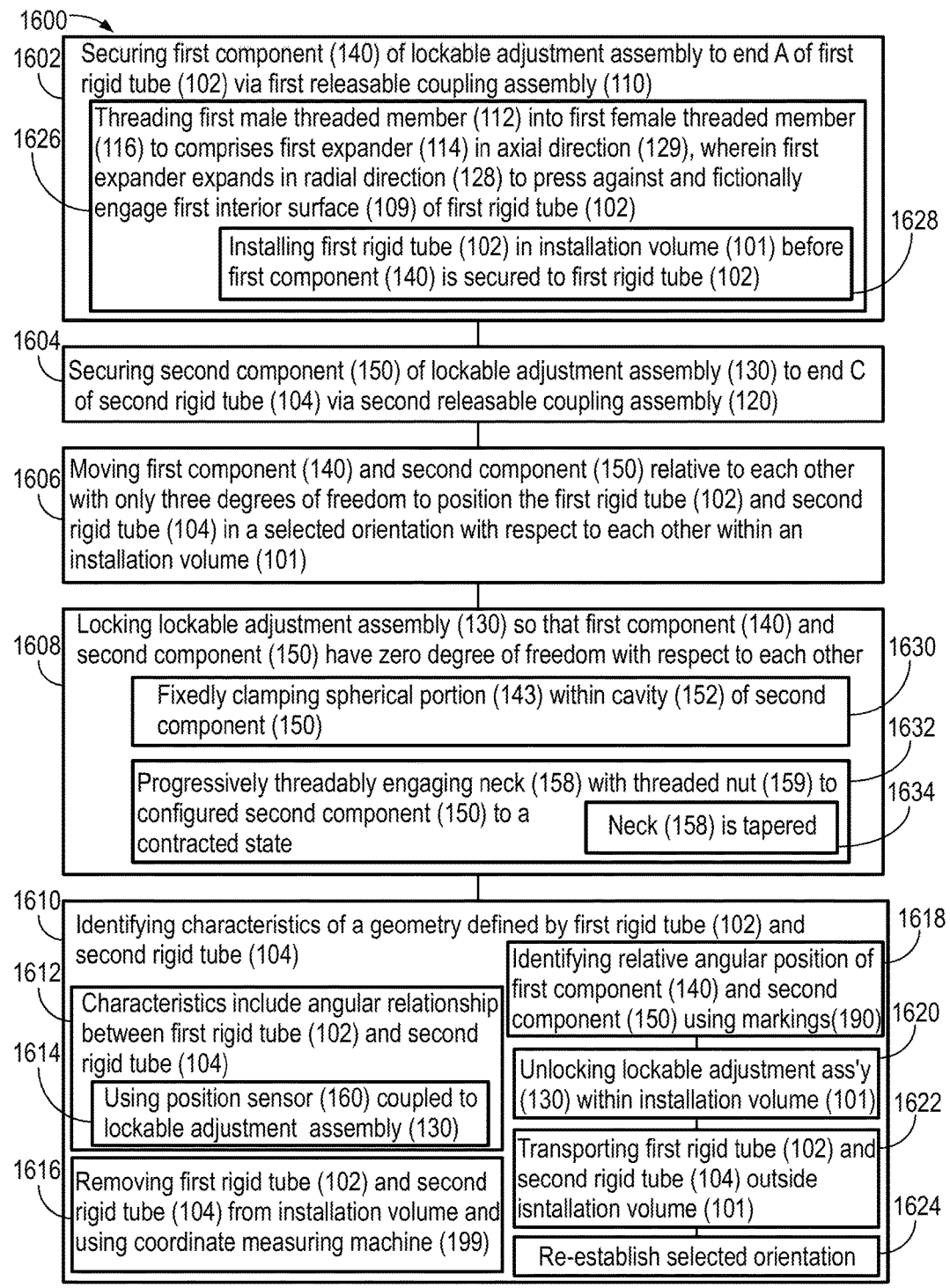
Figure 17:
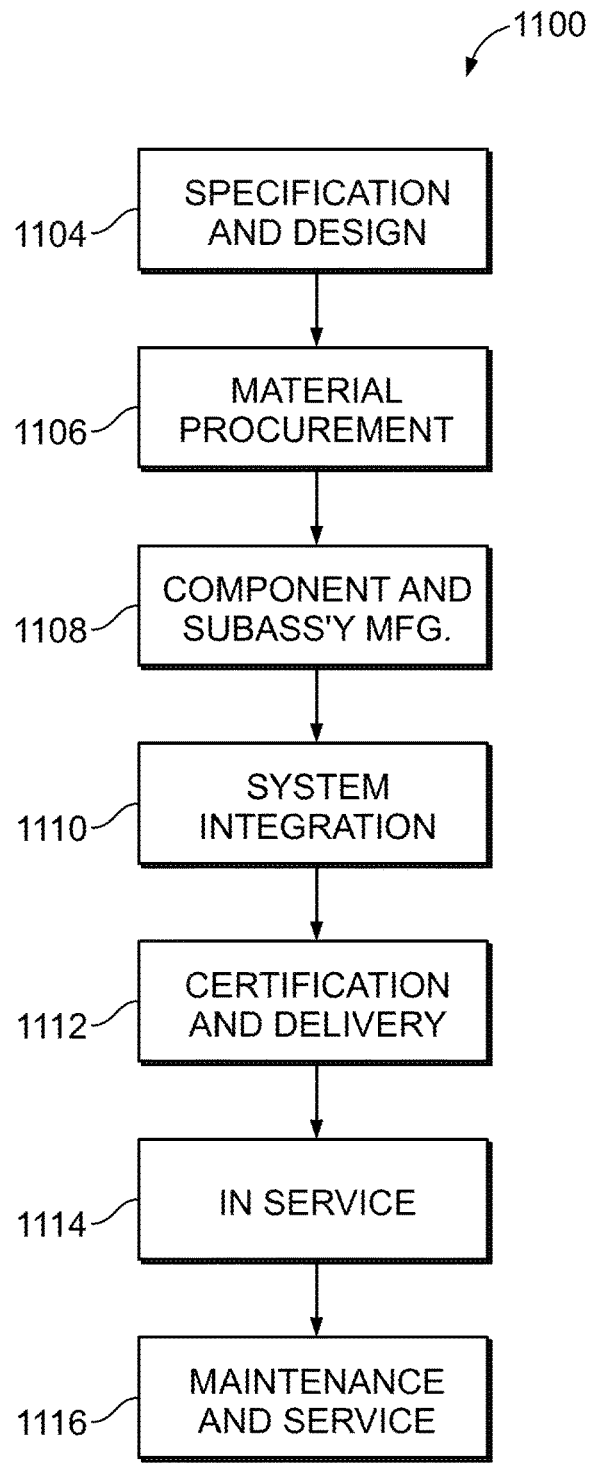

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a modeling assembly, according to one or more examples of the present disclosure;

FIG. 2 is a schematic, side elevation, exploded view of the modeling assembly of FIG. 1, according to one or more examples of the present disclosure;

FIG. 3 is a schematic, perspective view of a detail of the modeling assembly of FIG. 2, according to one or more examples of the present disclosure;

FIG. 4 is a schematic, side elevation view of a second component of the modeling assembly of FIG. 1, according to one or more examples of the present disclosure;

FIG. 5 is a schematic, end view of the second component of FIG. 4, according to one or more examples of the present disclosure;

FIG. 6 is a schematic, perspective view of the second component of FIG. 4, according to one or more examples of the present disclosure;

FIG. 7 is a schematic, perspective view of a first component of the modeling assembly of FIG. 1, according to one or more examples of the present disclosure;

FIG. 8 is a schematic, end view of the first component of FIG. 7, according to one or more examples of the present disclosure;

FIG. 9 is a schematic, side elevation view of the first component of FIG. 7, according to one or more examples of the present disclosure;

FIG. 10 is a schematic, longitudinal section view of a coupling of the modeling assembly of FIG. 1, according to one or more examples of the present disclosure;

FIG. 11 is a schematic, longitudinal section view of a coupling of the modeling assembly, according to one or more examples of the present disclosure;

FIG. 12 is a schematic, longitudinal section view of a coupling of the modeling assembly of FIG. 1, according to one or more examples of the present disclosure;

FIG. 13 is a schematic, side view of a second component of the modeling assembly of FIG. 1, according to one or more examples of the present disclosure;

FIG. 14 is a schematic, side view of a rigid tube of the modeling assembly of FIG. 1, according to one or more examples of the present disclosure;

FIG. 15 is a schematic depiction of degrees of freedom of a system;

FIG. 16 is a block diagram of a method of utilizing the modeling assembly of FIG. 1, according to one or more examples of the present disclosure;

FIG. 17 is a block diagram of aircraft production and service methodology; and

Figure 18:
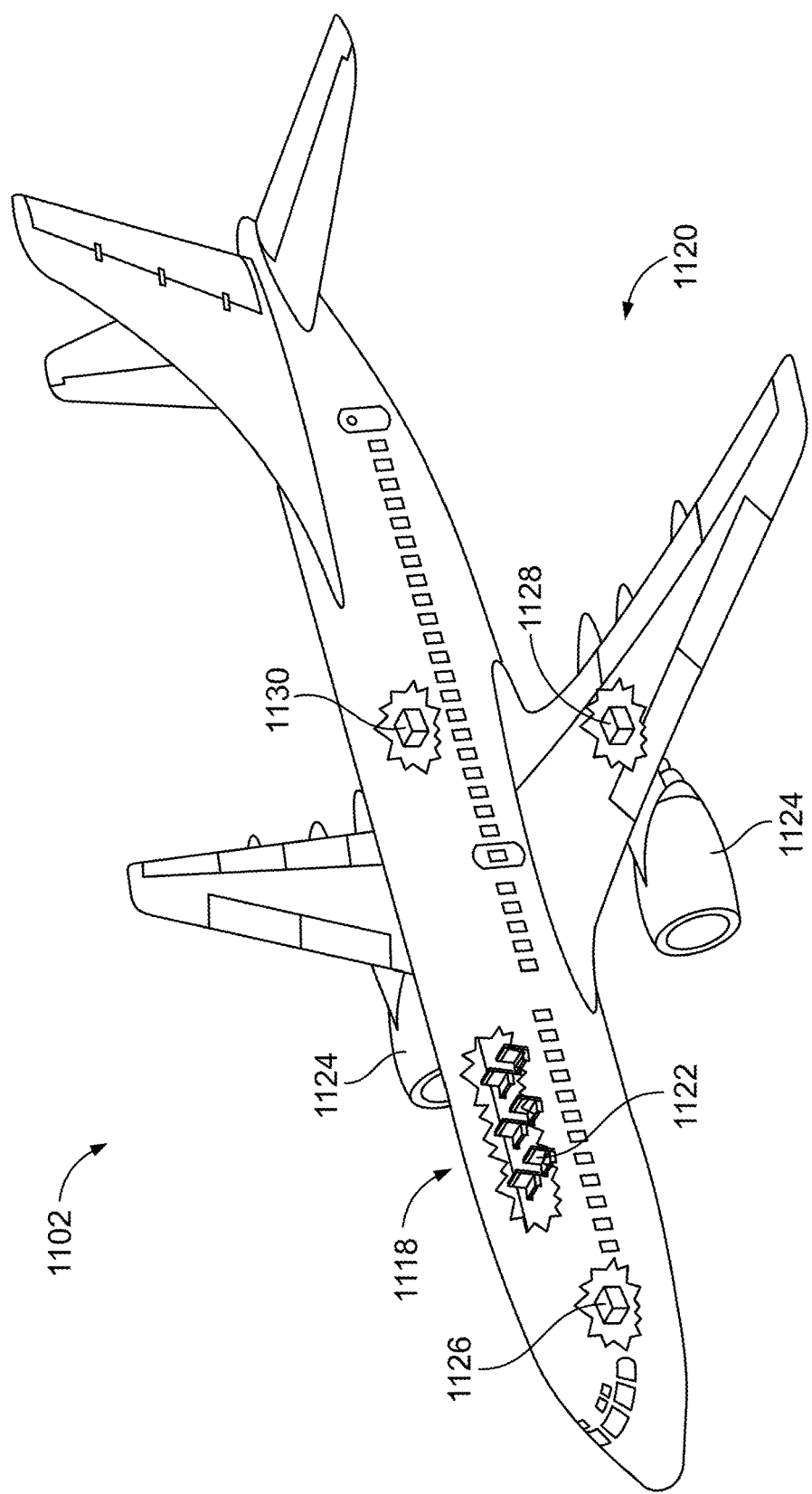

FIG. 18 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 17 and 18, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 17 and 18 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, or component "adapted to" or "configured to" perform a specified function is actually capable of performing the specified function rather than being merely potentially capable of performing the specified function. In other words, the system, apparatus, structure, article, element, or component is specifically selected, created, implemented, utilized, programmed, and/or designed for the purpose of performing the specified function. As used herein, "adapted to" and "configured to" denote existing characteristics of a system, apparatus, structure, article, element, or component which make the system, apparatus, structure, article, element, or component capable of actually performing the specified function. As used herein, a system, apparatus, structure, article, element, or component described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2 and 3, modeling assembly 100 for layout of rigid tubing is disclosed. Modeling assembly 100 comprises first releasable coupling assembly 110 and second releasable coupling assembly 120. Modeling assembly 100 also comprises lockable adjustment assembly 130, comprising first component 140 and second component 150. First component 140 of lockable adjustment assembly 130 is configured to be removably coupled to end A of first rigid tube 102, having first longitudinal axis 103, via first releasable coupling assembly 110. Second component 150 of lockable adjustment assembly 130 is configured to be removably coupled to end C of second rigid tube 104, having second longitudinal axis 105, via second releasable coupling assembly 120. Lockable adjustment assembly 130 is selectively configured to a loose coupled state or a locked coupled state. With lockable adjustment assembly 130 in loose coupled state, first component 140 of lockable adjustment assembly 130 and second component 150 of lockable adjustment assembly 130 have only three degrees of freedom relative to each other. With lockable adjustment assembly 130 in locked coupled state, first component 140 of lockable adjustment assembly 130 and second component 150 of lockable adjustment assembly 130 have zero degrees of freedom relative to each other. The preceding subject matter of this paragraph characterizes example 1 of the present disclosure.

Use of releasable coupling assemblies (e.g., first releasable coupling assembly 110 and second releasable coupling assembly 120) as set forth above allows for the positioning of rigid tubes (e.g., first rigid tube 102, second rigid tube 104) in a desired position, and for reliably and accurately measuring the positioning to provide for improved accuracy in fabricating tubing runs for installation in installation volume 101, such as in an airplane. Use of rigid tubes (e.g., first rigid tube 102, second rigid tube 104) allows for stability and accuracy in modeling runs to be installed. Use of lockable adjustment assembly 130 allows for convenient and reliable securement of the components of modeling assembly 100 during positioning and/or measurement. Modeling assembly 100 may be adjusted and assembled within installation volume 101 to account for structures and component to be encountered by a tubing run, and measurements of modeling assembly 100 used to fabricate a tubing run to be installed within installation volume 101. Modeling assembly 100 allows on the spot tube routings that may be used to create datasets, drawings, and/or sample tubes. Use of modeling assembly decreases the amount of time to create a tubing run as well as increases the accuracy of tubing run modeling relative to the use of flexible or bendable pipe or wire to simulate a tubing run.

For example, first component 140 and second component 150 of lockable adjustment assembly 130 may be configured to be releasably coupled to first rigid tube 102 or second rigid tube 104, respectively, via releasable coupling assemblies 120, 130, respectively, via a structural connection between first component 140 and first releasable coupling assembly 120 (and structural connection between second component 150 and second releasable coupling assembly 130), and via an interaction between first releasable coupling assembly 120 and first rigid tube 102 (and an interaction between second releasable coupling assembly 130 and second rigid tube 104). For example, first component 140 and first releasable coupling assembly may be joined via one or more of a threaded connection, a slotted connection, or a pinned connection. As another example, releasable coupling assembly 120 and first rigid tube 102 may be releasably secured through a member that expands (to secure) and contracts (to release). Alternatively or additionally, releasable coupling assembly 120 and first rigid tube 102 may be joined via latching members, and/or members that snap together and apart.

Lockable adjustment assembly 130 may be selectively configured in the loose coupled state and/or in the locked coupled state via an interaction between first component 140 and second component 150. For example, second component 150 may loosely accept first component 140, with second component 150 adjustable to reduce a clearance between first component 140 and second component 150 to place lockable adjustment assembly 130 in the locked coupled state. For example, second component 150 may define a hemispherical shape that accepts a spherically shaped first component 140.

With particular reference to FIG. 15, it may be noted that the six degrees of freedom may include forward/back, up/down, left/right, pitch, yaw, and roll.

Use of rigid tubes (e.g., first rigid tube 102, second rigid tube 104) allows for reliable measurement of positions and reproduction of modeled positions. In the depicted examples, the various rigid tubes are depicted as straight; however, one or more rigid tubes may have a predefined bent or curved portion in various examples. In some examples, straight rigid tubes may be employed, with each bend or turn in a run being modeled represented by a lockable adjustment assembly (e.g., lockable adjustment assembly 130) interposed between two lengths of tube on either side of the bend or turn being modeled. As discussed herein, installation volume 101 in various examples may be, for example, an interior or other portion of an airplane; however, other installation volumes may be utilized in alternative examples. The tubing runs being modeled, for example, may be for hydraulic lines, pneumatic lines, electrical lines (e.g., conduit), or water or other fluid delivery lines, among others.

Referring generally to FIG. 1 and particularly to, e.g., FIGS. 2, 3, and 15, the three degrees of freedom of first component 140 of lockable adjustment assembly 130 and second component 150 of lockable adjustment assembly 130 relative to each other are pitch, yaw, and roll. The preceding subject matter of this paragraph characterizes example 2 of the present disclosure, wherein example 2 also includes the subject matter according to example 1, above.

Allowing freedom of movement in pitch, yaw, and roll directions while constraining movements in other directions allows for free rotation and angular positioning of first component 140 and second component 150 relative to each other, while maintaining consistency in other directions. As a tubing run being formed may have straight portions joined by an angled connection (e.g., either a bend in tubing or an elbow or other joint interposed between straight sections), allowing for angular motion or displacement in pitch, yaw, and roll directions accurately models the interrelationship between adjacent tube portions in the run to be formed.

Referring generally to FIG. 1 and particularly to, e.g., FIGS. 2-3 and 10-12, first releasable coupling assembly 110 comprises first female threaded member 116 and first male threaded member 112. First male threaded member 112 comprises first portion 113 and is configured to be threaded into first female threaded member 116. Only first portion 113 of first male threaded member 112 is configured to pass through first component 140 of lockable adjustment assembly 130. First releasable coupling assembly (110) also comprises first expander 114, configured to be interposed between first component 140 of lockable adjustment assembly 130 and first female threaded member 116. First expander 114 comprises through central cavity 117. When first female threaded member 116 and first expander 114 are positioned inside first rigid tube 102, first portion 113 of first male threaded member 112 is inserted through first component 140 of lockable adjustment assembly 130, and first male threaded member 112 is threaded into first female threaded member 116 to compress first expander 114 in axial direction 129 along first longitudinal axis 103 of first rigid tube 102 between first component 140 of lockable adjustment assembly 130 and first female threaded member 116, first expander 114 expands in radial direction 128, perpendicular to first longitudinal axis 103 of first rigid tube 102, to press against and frictionally engage first interior surface 109 of first rigid tube 102. The preceding subject matter of this paragraph characterizes example 3 of the present disclosure, wherein example 3 also includes the subject matter according to any one of examples 1 or 2, above.

Use of first expander 114 provides for convenient, reliable securement and disengagement of first rigid tube 102 and lockable adjustment assembly 130. For example, by tightening first female threaded member 116 on first male threaded member 112 by hand or with a tool, first rigid tube 102 and lockable adjustment assembly 130 may be secured, and by loosening first female threaded member 116 on first male threaded member 112, first rigid tube 102 and lockable adjustment assembly 130 may be released. Use of first expander 114 in various examples can also accommodate nominal differences of sizes of rigid tubes and/or imperfections or variances on first interior surface 109 of first rigid tube 102.

First expander 114 may be made of rubber or other compressible material, and may be formed in a generally annular shape, with an inner diameter about the same size as an outer diameter of first female threaded member 116 and an outer diameter (in a non-expanded state at which first expander 114 is not subjected to external forces) that is smaller than an inner diameter of first rigid tube 102. Then, when first expander 114 is subjected to an expanding force (e.g., a force causing first expander 114 to expand radially, such as an axially compressing force), the outer diameter of first expander 114 increases to come into contact with the inner diameter of first rigid tube 102.

Referring generally to FIG. 1 and particularly to, e.g., FIGS. 2 and 10, first component 140 comprises first through opening 141 and first male threaded member 112 further comprises second portion 111. First portion 113 of first male threaded member 112 is configured to pass through first through opening 141 of first component 140. Second portion 111 of first male threaded member 112 is configured not to pass through first through opening 141 of first component 140. The preceding subject matter of this paragraph characterizes example 4 of the present disclosure, wherein example 4 also includes the subject matter according to example 3, above.

Using second portion 111 that does not pass through first through opening 141 allows for reliable positioning and securement of first male threaded member 112 with respect to first component 140, for example during actuation of first male threaded member 112 with respect to first female threaded member 116.

First male threaded member 112, for example, may be a cap screw having first portion 113 being a threaded length, and second portion 111 being a screw head (e.g., socket screw head) having a larger diameter than first portion 113. Second portion 111 may be utilized in connection with a tool (e.g., allen key or socket) to actuate first male threaded member 112 with respect to first female threaded member 116.

Referring generally to FIG. 1 and particularly to, e.g., FIGS. 2 and 10, first female threaded member 116 comprises extension 115 and flange 119. Extension 115 is configured to be accepted within through central cavity 117 of first expander 114 and to support at least a portion of first expander 114 in radial direction 128. Flange 119 is configured to axially compress first expander 114 when first portion 113 of first male threaded member 112 is threaded into first female threaded member 116. The preceding subject matter of this paragraph characterizes example 5 of the present disclosure, wherein example 5 also includes the subject matter according to any one of examples 3 or 4, above.

Extension 115 helps support first expander 114 and prevent first expander 114 from extending toward threads of first male threaded member 112. Flange 119 acts to urge first expander 114 against first rigid tube 102, as axial compression of first expander 114 results in outward radial expansion when extension 115 prevents inward radial expansion.

Extension 115 and flange 119 may be made of materials (e.g., steel) that are more rigid than first expander 114 to help ensure that first expander 114 deforms instead of extension 115 and flange 119. Flange 119 may have an outer diameter slightly smaller than the outer diameter of first expander 114 to provide support against a substantial portion of first expander 114 in an axial direction while maintaining a clearance between flange 119 and first interior surface 109 of first rigid tube 102.

Referring generally to FIG. 1 and particularly to, e.g., FIGS. 2-3 and 11, first releasable coupling assembly 110 further comprises first washer 219, configured to be interposed between first expander 114 and flange 119 of first female threaded member 116 of first releasable coupling assembly 110. The preceding subject matter of this paragraph characterizes example 6 of the present disclosure, wherein example 6 also includes the subject matter according to example 5, above.

First washer 219 provides a larger diameter compression surface for use with larger diameter rigid tubes, providing flexibility and allowing lockable adjustment assembly 130 to be used with a variety of tube sizes, reducing or eliminating the need for additional sized lockable adjustment assemblies.

First washer 219 may be made of materials (e.g., steel) that are more rigid than first expander 114 to help ensure that first expander 114 deforms instead of first washer 219. First washer 219 may have an outer diameter slightly smaller than the outer diameter of first expander 114 to provide support against a substantial portion of first expander 114 in an axial direction while maintaining a clearance between first washer 219 and first interior surface 109 of first rigid tube 102.

Referring generally to FIG. 1 and particularly to, e.g., FIGS. 2-3 and 11, first releasable coupling assembly 110 further comprises second washer 217, configured to be interposed between first expander 114 and first component 140 of lockable adjustment assembly 130. The preceding subject matter of this paragraph characterizes example 7 of the present disclosure, wherein example 7 also includes the subject matter according to any one of examples 3-6, above.

Second washer 217 helps prevent axial movement of first expander 114 toward either first component 140 or second component 150 of lockable adjustment member 130, thereby helping to encourage radial expansion of first expander 114 when first female threaded member 116 is tightened on first male threaded member 112. Second washer 217 helps allow for use of lockable adjustment member 130 with tube sizes having inner diameters larger than an outer diameter of first component 140 or second component 150.

Second washer 217 may be made of materials (e.g., steel) that are more rigid than first expander 114 to help ensure that first expander 114 deforms instead of second washer 217.

Referring generally to FIG. 1 and particularly to, e.g., FIGS. 2-3 and 11, second washer 217 has an outer diameter that is smaller than an inner diameter of first interior surface 109 of first rigid tube 102. The preceding subject matter of this paragraph characterizes example 8 of the present disclosure, wherein example 8 also includes the subject matter according to example 7, above.

Use of an outer diameter that is smaller than an inner diameter of first rigid tube 102 allows for a clearance for second washer 217 to be disposed inside of first rigid tube 102, reducing the size or improving the compactness of modeling assembly 100.

Referring generally to FIG. 1 and particularly to, e.g., FIGS. 2-3 and 11, second washer 217 has an outer diameter that is larger than an inner diameter of first interior surface 109 of first rigid tube 102. The preceding subject matter of this paragraph characterizes example 9 of the present disclosure, wherein example 9 also includes the subject matter according to example 7, above.

Use of an outer diameter that is larger than an inner diameter of first rigid tube 102 allows for a positive mechanical stop or interaction between first rigid tube 102 and second washer 217, helping provide for consistent, reliable positioning of lockable adjustment member 130 and first rigid tube 102 relative to each other.

Referring generally to FIG. 1 and particularly to, e.g., FIGS. 2-3 and 10-12, second releasable coupling assembly 120 comprises second female threaded member 126 and second male threaded member 122. Second male threaded member 122 comprises first portion 123 and is configured to be threaded into second female threaded member 126. Only first portion 123 of second male threaded member 122 is configured to pass through second component 150 of lockable adjustment assembly 130. Second releasable coupling assembly (120) also comprises second expander 124, which is configured to be interposed between second component 150 of lockable adjustment assembly 130 and second female threaded member 126. Second expander 124 comprises through central cavity 118. When second female threaded member 126 and second expander 124 are positioned inside second rigid tube 104, first portion 123 of second male threaded member 122 is inserted through second component 150 of lockable adjustment assembly 130, and second male threaded member 122 is threaded into second female threaded member 126 to compress second expander 124 in axial direction 131 along second longitudinal axis 105 of second rigid tube 104 between second component 150 of lockable adjustment assembly 130 and second female threaded member 126, second expander 124 expands in radial direction 132, perpendicular to second longitudinal axis 105 of second rigid tube 104 to press against and frictionally engage second interior surface 209 of second rigid tube 104. The preceding subject matter of this paragraph characterizes example 10 of the present disclosure, wherein example 10 also includes the subject matter according to any one of examples 1-9, above.

Use of second expander 124 provides for convenient, reliable securement and disengagement of second rigid tube 104 and lockable adjustment assembly 130. For example, by tightening second female threaded member 126 on second male threaded member 122 by hand or with a tool, second rigid tube 104 and lockable adjustment assembly 130 may be secured, and by loosening second female threaded member 126 on second male threaded member 122, second rigid tube 104 and lockable adjustment assembly 130 may be released. Use of second expander 124 in various examples can also accommodate nominal differences of sizes of rigid tubes and/or imperfections or variances on second interior surface 209 of second rigid tube 104.

Second expander 124 may be made of rubber or other compressible material, and may be formed in a generally annular shape, with an inner diameter about the same size as an outer diameter of second female threaded member 126 and an outer diameter (in a non-expanded state at which second expander 124 is not subjected to external forces) that is smaller than an inner diameter of second rigid tube 104. Then, when second expander 124 is subjected to an expanding force (e.g., a force causing second expander 124 to expand radially, such as an axially compressing force), the outer diameter of second expander 124 increases to come into contact with the inner diameter of second rigid tube 104.

Referring generally to FIG. 1 and particularly to, e.g., FIGS. 2-3 and 10-12, second component 150 comprises second through opening 151 and second male threaded member 122 further comprises second portion 121. First portion 123 of second male threaded member 122 is configured to pass through second through opening 151 of second component 150. Second portion 121 of second male threaded member 122 is configured not to pass through second through opening 151 of second component 150. The preceding subject matter of this paragraph characterizes example 11 of the present disclosure, wherein example 11 also includes the subject matter according to example 10, above.

Using second portion 121 that does not pass through second through opening 151 allows for reliable positioning and securement of second male threaded member 122 with respect to second component 150, for example during actuation of second male threaded member 122 with respect to second female threaded member 126.

Second male threaded member 122, for example, may be a cap screw having first portion 123 being a threaded length, and second portion 121 being a screw head (e.g., socket screw head) having a larger diameter than first portion 123. Second portion 121 may be utilized in connection with a tool (e.g., allen key or hex socket) to actuate second male threaded member 122 with respect to second female threaded member 126.

Referring generally to FIG. 1 and particularly to, e.g., FIGS. 2-9, first component 140 comprises spherical portion 143. Second component 150 comprises cavity 152 selectively configured to an expanded state, corresponding to the loose coupled stated of lockable adjustment assembly 130, or a contracted state, corresponding to the locked coupled state of lockable adjustment assembly 130. In the expanded state, cavity 152 of second component 150 is configured to be loosely coupled with spherical portion 143 of first component 140. In the contracted state, cavity 152 of second component 150 is configured to fixedly retain spherical portion 143 of first component 140. The preceding subject matter of this paragraph characterizes example 12 of the present disclosure, wherein example 12 also includes the subject matter according to any one of examples 1-11, above.

Use of spherical portion 143 and corresponding cavity 152 provides for consistent, reliable securement of lockable adjustment assembly 130. Also, use of spherical portion 143 and corresponding cavity 152 allows for freedom of movement in pitch, yaw, and roll degrees of freedom, while constraining other motions of first component 140 and second component 150 relative to each other.

Spherical portion 143 may be a solid member made of a rigid material (e.g., steel) to prevent compression of spherical portion 143 when cavity 152 is placed in the contracted state. Cavity 152 may define a volume encompassing slightly more than half of a sphere, so that spherical portion 143 may be loosely retained in cavity 152 when cavity 152 is in the expanded state. Alternatively or additionally, cavity 152 may be sized to be about the same size or slightly smaller than spherical portion 143, but be defined by members having a sufficient resiliency or flexibility that insertion of spherical portion 143 may bias the members defining cavity 152 outwardly, with the members defining cavity 152 resiliently urging against spherical portion 143 sufficiently to loosely retain spherical portion 143 while still permitting rotation of spherical portion 143 relative to cavity 152.

Referring generally to FIG. 1 and particularly to, e.g., FIGS. 4-6, second component 150 comprises fingers 153 and notches 154 formed between fingers 153. Each of notches 154 has width 156. Width 156 of notches 154 decreases when cavity 152 of second component 150 is configured from the expanded state to the contracted state. Width 156 of notches 154 increases when cavity 152 of second component 150 is configured from the contracted state to the expanded state. The preceding subject matter of this paragraph characterizes example 13 of the present disclosure, wherein example 13 also includes the subject matter according to example 12, above.

Use of fingers 153 separated by notches 154 having variable width 156 allows for consistent, reliable contraction and expansion of cavity 152.

Fingers 153 may be made of a resiliently flexible material (e.g., steel), with the thickness of fingers 153 and the size of notches 154 designed or selected to allow for convenient or easy biasing of fingers 153 while still providing enough rigidity to securely grasp spherical portion 154 in the contracted state.

Referring generally to FIG. 1 and particularly to, e.g., FIGS. 2-6, second component 150 further comprises neck 158. Lockable adjustment assembly 130 further comprises threaded nut 159, configured to progressively threadably engage neck 158 of second component 150 to configure cavity 152 of second component 150 to the contracted state or to progressively threadably disengage neck 158 of second component 150 to configure cavity 152 of second component 150 to the expanded state. The preceding subject matter of this paragraph characterizes example 14 of the present disclosure, wherein example 14 also includes the subject matter according to example 13, above.

Threaded nut 159 may be actuated in a rotational manner to advance along neck 158 to tighten or loosen cavity 152 about spherical portion 143 (or actuate cavity 152 between contracted and expanded states). Threaded nut 159 allows for convenient actuation of cavity 152 between contracted and expanded states by hand or by using a tool, such as a wrench.

Referring generally to FIG. 1 and particularly to, e.g., FIGS. 2-9 and 13, neck 158 of second component 150 is tapered. The preceding subject matter of this paragraph characterizes example 15 of the present disclosure, wherein example 15 also includes the subject matter according to example 14, above.

Use of tapered neck 158 in connection with threaded nut 159 allows for convenient actuation of cavity 152 between contracted and expanded states by hand or by using a tool, such as a wrench.

Neck 158 may taper from a smaller diameter away from a center of cavity 152 to a larger diameter toward the center of cavity 152. Thus, as threaded nut 159 is advanced toward cavity 152, threaded nut 159 presses against the taper of neck 158, urging cavity 152 toward the contracted state. As threaded nut 159 is advanced away from cavity 152, neck 158 may resiliently return to its unbiased state, urging cavity 152 toward the expanded state.

Referring generally to FIG. 1 and particularly to, e.g., FIGS. 2-9 and 13, first component 140 of lockable adjustment assembly 130 further comprises neck 142. At least one of fingers 153 of second component 150 comprises relief cutout 157 configured to clear neck 142 of first component 140. The preceding subject matter of this paragraph characterizes example 16 of the present disclosure, wherein example 16 also includes the subject matter according to any one of examples 13-15, above.

Use of relief cutout 157 allows for an increase in the range of available angular motion between first component 140 and second component 150 relative to each other (and accordingly between first rigid tube 102 and second rigid tube 104 relative to each other) by providing a clearance for neck 142 of first component 140.

Referring generally to FIG. 1 and particularly to, e.g., FIGS. 2-3 and 7-9, first component 140 of lockable adjustment assembly 130 comprises markings 190 configured to indicate an orientation of first rigid tube 102 with respect to second rigid tube 104. The preceding subject matter of this paragraph characterizes example 17 of the present disclosure, wherein example 17 also includes the subject matter according to any one of examples 1-16, above.

The use of markings 190 allows for convenient, reliable visual determination or confirmation of positioning or orientation of first rigid tube 102 with respect to second rigid tube 104. For example, with modeling assembly 100 in place in a desired location, markings 190 may be used to determine the orientation of first rigid tube 102 with respect to second rigid tube 104. The determined orientation may be used, for example, to construct the run to be installed. Alternatively, modeling assembly 100 may be disassembled in the desired location for easy transport, re-assembled in a remote location (e.g., shop located at a distance from the desired location or installation location 101) using markings 190 as a guide, and measured.

Markings 190, for example, may be provided as a grid of lines or arcs traversing a surface of second component 140 (e.g., spherical portion 143). Additionally or alternatively, markings 190 may include alphanumeric indicators.

Referring generally to FIG. 1 and particularly to, e.g., FIGS. 2-3 and 7-9, first component 140 of lockable adjustment assembly 130 comprises at least one marking 162 indicating a center of lockable adjustment assembly 130. The preceding subject matter of this paragraph characterizes example 18 of the present disclosure, wherein example 18 also includes the subject matter according to any one of examples 1-17, above.

Use of marking 162 provides for convenient, reliable location of a center of lockable adjustment assembly 130, which may be used, for example, to measure distances between centers of adjacent lockable adjustment assemblies defining end points of a portion of a tubing run.

Referring generally to FIG. 1 and particularly to, e.g., FIGS. 2-3 and 7-9, lockable adjustment assembly 130 further comprises position sensor 160. The preceding subject matter of this paragraph characterizes example 19 of the present disclosure, wherein example 19 also includes the subject matter according to any one of examples 1-18, above.

Use of position sensor 160 provides for reliable automated determination of a position and/or orientation of rigid tubes mounted to lockable adjustment assembly. For example, position sensor 160 may include electronic sensor configured to identify a position of a portion (e.g., center) of lockable adjustment assembly. As another example, position sensor 160 may include one or more electronic sensors configured to identify an angular relationship between first rigid tube 102 and second rigid tube 104.

Referring generally to FIG. 1 and particularly to, e.g., FIGS. 2-3 and 7-9, position sensor 160 is coupled to one of first component 140 or second component 150. The preceding subject matter of this paragraph characterizes example 20 of the present disclosure, wherein example 20 also includes the subject matter according to example 19, above.

Coupling of position sensor 160 to one of first component 140 or second component 150 provides secure, reliable, positioning of position sensor 160 at a predetermined location for reliable measurement of modeling assembly 100. For example, position sensor may be disposed inside first component 140 (e.g., at a center of a hemisphere or other shape defined by first component 140).

Referring generally to FIG. 1 and particularly to, e.g., FIGS. 2-3 and 14, at least one of first rigid tube 102 or second rigid tube 104 comprises telescoping assembly 180. At least one of first rigid tube 102 or second rigid tube 104 has adjustable length 182. The preceding subject matter of this paragraph characterizes example 21 of the present disclosure, wherein example 21 also includes the subject matter according to any one of examples 1-20, above.

Use of telescoping assembly 180 allows for varying length of a rigid tube as well as orientation of two or more rigid tubes for convenient, accurate modeling of a tubing run within installation volume 101. The illustrated example depicts only one telescoping section; however it may be noted that in alternate examples plural nested telescoping sections may be provided in first rigid tube 102 or second rigid tube 104. Further, telescoping assembly 180 may also include or have associated therewith markings for convenient visual determination of adjustable length 182. Alternatively or additionally, telescoping assembly 180 may also include or have associated therewith a locking or securement assembly to maintain telescoping assembly 180 at a desired adjustable length 182.

Referring generally to, e.g., FIGS. 1-3 and particularly to FIG. 16, method 300 of modeling layout of rigid tubing is disclosed. Method 300 comprises (block 1602) securing first component 140 of lockable adjustment assembly 130 to end A of first rigid tube 102 via first releasable coupling assembly 110. Method 300 also comprises (block 1604) securing second component 150 of lockable adjustment assembly 130 to end C of second rigid tube 104 via second releasable coupling assembly 120. Additionally, method 300 comprises (block 1606) moving first component 140 and second component 150, loosely coupled with each other, relative to each other with only three degrees of freedom to position first rigid tube 102 and second rigid tube 104 in a selected orientation with respect to each other within installation volume 101. Method 300 further comprises (block 1608), with first rigid tube 102 and second rigid tube 104 in the selected orientation relative to each other, locking lockable adjustment assembly 130 so that first component 140 and second component 150 have zero degrees of freedom relative to each other. The preceding subject matter of this paragraph characterizes example 22 of the present disclosure.

Rigid tubes (e.g., first rigid tube 102, second rigid tube 104) for modeling tubing runs may accordingly be reliably oriented in a desired position, and accurately measured, providing improved accuracy in fabricating tubing runs for installation in a selected environment, such as in an airplane. Use of rigid tubes (e.g., first rigid tube 102, second rigid tube 104) allows for stability and accuracy in modeling runs to be installed at a location at which one or more tubing runs are to be installed (e.g., installation volume 101). Use of lockable adjustment assembly 130 allows for convenient and reliable securement of the components of modeling assembly 100 during positioning and/or measurement.

Referring generally to, e.g., FIGS. 1-3 and particularly to FIG. 16, method 300 further comprises (block 1610) identifying characteristics of a geometry defined by first rigid tube 102 and second rigid tube 104. The preceding subject matter of this paragraph characterizes example 23 of the present disclosure, wherein example 23 also includes the subject matter according to example 22, above.

Identified characteristics of a geometry defined by first rigid tube 102 and second rigid tube 104 may be used to accurately fabricate a tubing run to be installed in installation volume 101. Alternatively, the identified characteristics may be used to dis-assemble and re-assemble modeling assembly 100 in a remote location for more convenient and/or more accurate measurement. The identified characteristics may include for example, an angular relationship between first rigid tube 102 and second rigid tube 104, and/or a length of one or more of first rigid tube 102 and second rigid tube 104.

Referring generally to, e.g., FIGS. 1-3 and particularly to FIG. 16 (block 1612), characteristics of the geometry defined by first rigid tube 102 and second rigid tube 104 include an angular relationship between first rigid tube 102 and second rigid tube 104. The preceding subject matter of this paragraph characterizes example 24 of the present disclosure, wherein example 24 also includes the subject matter according to example 23, above.

An identified angular relationship may be utilized to accurately fabricate a tubing run, with the angular relationship between first rigid tube 102 and second rigid tube 104 used to provide a bend between corresponding portions of a tubing run to be installed.

Referring generally to, e.g., FIGS. 1-3 and 7 and particularly to FIG. 16, the angular relationship between first rigid tube 102 and second rigid tube 104 is determined (block 1614) using position sensor 160 coupled to lockable adjustment assembly 130 and configured to determine a relative angular position of first component 140 of lockable adjustment assembly 130 and second component 150 of lockable adjustment assembly 130. The preceding subject matter of this paragraph characterizes example 25 of the present disclosure, wherein example 25 also includes the subject matter according to example 24, above.

Position sensor 160 may be used to provide accurate, reliable, automated measurement of the angular relationship, reducing or eliminating operating error and/or increasing automation of measuring and fabricating a tubing run for use in installation volume 101.

Referring generally to, e.g., FIGS. 1-3 and particularly to FIG. 16, identifying the characteristics of the geometry defined by first rigid tube 102 and second rigid tube 104 comprises (block 1616) removing first rigid tube 102 and second rigid tube 104, locked in the selected orientation by lockable adjustment assembly 130, from installation volume 101 and using coordinate measuring machine 199 to identify the characteristics of the geometry. The preceding subject matter of this paragraph characterizes example 26 of the present disclosure, wherein example 26 also includes the subject matter according to any one of examples 23 or 24, above.

Removing first rigid tube 102 and second rigid tube 104 from installation volume 101 and measuring using coordinate measuring machine 199 provides for accurate measurement of modeling assembly 100 without requiring transport of coordinate measuring machine 199 to installation volume 101. Use of a coordinate measuring machine provides for generating digital data that may be used in design, manufacture, and/or assembly of a tubing run. Coordinate measuring machine 199 may be any measurement machine known in the art, such as a Romer arm.

Referring generally to, e.g., FIGS. 1-3 and 9 and particularly to FIG. 16, with first rigid tube 102 and second rigid tube 104 locked in the selected orientation relative to each other, identifying the characteristics of the geometry defined by first rigid tube 102 and second rigid tube 104 comprises (block 1618) identifying a relative angular position of first component 140 and second component 150 of lockable adjustment assembly 130 using markings 190 on at least one of first component 140 and second component 150. The preceding subject matter of this paragraph characterizes example 27 of the present disclosure, wherein example 27 also includes the subject matter according to example 23, above.

The use of markings 190 allows for convenient, reliable visual determination or confirmation of positioning or orientation of first rigid tube 102 with respect to second rigid tube 104. For example, with modeling assembly 100 in place in a desired location, markings 190 may be used to determine the orientation of first rigid tube 102 with respect to second rigid tube 104. The determined orientation may be used, for example, to construct the run to be installed. Alternatively, modeling assembly 100 may be disassembled in the desired location for easy transport, re-assembled in a remote location (e.g., shop located at a distance from the desired location or installation location 101) using markings 190 as a guide, and measured.

Referring generally to, e.g., FIGS. 1-3 and particularly to FIG. 16, method 300 further comprises (block 1620) unlocking lockable adjustment assembly 130 within installation volume 101, (block 1622) transporting first rigid tube 102 and second rigid tube 104 outside installation volume 101, and (block 1624) reestablishing the selected orientation of first rigid tube 102 and second rigid tube 104 relative to each other based on the relative angular position of first component 140 and second component 150. The preceding subject matter of this paragraph characterizes example 28 of the present disclosure, wherein example 28 also includes the subject matter according to example 27, above.

Dis-assembling and re-assembling locking adjustment assembly 130 and/or other components of modeling assembly 100 provides for convenient transportation of modeling assembly 100, which may be long or otherwise unwieldy in an assembled state simulating the tubing run to be installed. Further, due to obstacles or impediments in installation volume 101, it may be difficult or impractical to remove modeling assembly 100 from installation volume 101 in an assembled state and/or to measure modeling assembly 100 in installation volume 101.

Referring generally to, e.g., FIGS. 1-3 and particularly to FIG. 16, securing first component 140 of lockable adjustment assembly 130 to end C of second rigid tube 104 comprises (block 1626) threading first male threaded member 112 into first female threaded member 116 to compress first expander 114 in axial direction 129 along first longitudinal axis 103 of first rigid tube 102 between first female threaded member 116 and first component 140. As a result, first expander 114 expands in radial direction 128, perpendicular to first longitudinal axis 103 of first rigid tube 102, to press against and frictionally engage first interior surface 109 of first rigid tube 102. The preceding subject matter of this paragraph characterizes example 29 of the present disclosure, wherein example 29 also includes the subject matter according to any one of examples 22-28, above.

Use of first expander 114 provides for convenient, reliable securement and disengagement of first rigid tube 102 and lockable adjustment assembly 130. For example, by tightening first female threaded member 116 on first male threaded member 112 by hand or with a tool, first rigid tube 102 and lockable adjustment assembly 130 may be secured, and by loosening first female threaded member 116 on first male threaded member 112, first rigid tube 102 and lockable adjustment assembly 130 may be released. Use of first expander 114 in various examples can also accommodate nominal differences of sizes of rigid tubes and/or imperfections or variances on first interior surface 109 of first rigid tube 102.

Referring generally to, e.g., FIGS. 1-3 and particularly to FIG. 16 (block 1628), first rigid tube 102 is installed within installation volume 101 before first component 140 is secured to first rigid tube 102. The preceding subject matter of this paragraph characterizes example 30 of the present disclosure, wherein example 30 also includes the subject matter according to example 29, above.

Installing first rigid tube 102 within installation volume 101 before securing first component 140 allows for manipulation and position of first rigid tube 102 in tight quarters that may not permit installation of rigid tubes coupled to each other prior to installation.

Referring generally to, e.g., FIGS. 1-9 and particularly to FIG. 16, locking lockable adjustment assembly 130 comprises (block 1630) fixedly clamping spherical portion 143 of first component 140 within cavity 152 of second component 150. The preceding subject matter of this paragraph characterizes example 31 of the present disclosure, wherein example 31 also includes the subject matter according to any one of examples 22-30, above.

Use of spherical portion 143 and corresponding cavity 152 provides for consistent, reliable securement of lockable adjustment assembly 130. Also, use of spherical portion 143 and corresponding cavity 152 allows for freedom of movement in pitch, yaw, and roll degrees of freedom, while constraining other motions of first component 140 and second component 150 relative to each other.

Referring generally to, e.g., FIGS. 1-9, 13 and particularly to FIG. 16 method 300 further comprises (block 1632) progressively threadably engaging neck 158 of second component 150 with threaded nut 159 to configure second component 150 to a contracted state to lock spherical portion 143 of first component 140 within cavity 152 of second component 150. The preceding subject matter of this paragraph characterizes example 32 of the present disclosure, wherein example 32 also includes the subject matter according to example 31, above.

Use of threaded nut 159 allows for convenient actuation of cavity 152 between contracted and expanded states by hand or by using a tool, such as a wrench.

Referring generally to, e.g., FIGS. 1-9, 13 and particularly to FIG. 16 (block 1634), neck 158 of second component 150 is tapered. The preceding subject matter of this paragraph characterizes example 33 of the present disclosure, wherein example 33 also includes the subject matter according to example 32, above.

Use of tapered neck 158 in connection with threaded nut 159 allows for convenient actuation of cavity 152 between contracted and expanded states by hand or by using a tool, such as a wrench.

Referring generally to FIG. 1 and particularly to, e.g., FIGS. 2-3, modeling assembly 100 for layout of rigid tubing is disclosed. Modeling assembly 100 comprises first rigid tubes 102, each having end A and end B, and second rigid tubes 104, each having end C and end D. Modeling assembly 100 also comprises first releasable coupling assemblies 110 and second releasable coupling assemblies 120. Modeling assembly 100 also comprises lockable adjustment assemblies 130 each comprising first component 140 and second component 150. First component 140 of each one of lockable adjustment assemblies 130 is configured to be removably coupled to end A or end B of one of first rigid tubes 102 via one of first releasable coupling assemblies 110. Second component 150 of each one of lockable adjustment assemblies 130 is configured to be removably coupled to one of end C or end D of one of second rigid tubes 104 via one of second releasable coupling assemblies 120. Each one of lockable adjustment assemblies 130 is selectively configured to a loose coupled state or a locked coupled state. With one of lockable adjustment assemblies 130 in the loose coupled state, first component 140 of the one of lockable adjustment assemblies 130 and second component 150 of the one of lockable adjustment assemblies 130 have only three degrees of freedom relative to each other. With one of lockable adjustment assemblies 130 in the locked coupled state, first component 140 of the one of lockable adjustment assemblies 130 and second component 150 of the one of lockable adjustment assemblies 130 have zero degrees of freedom relative to each other. The preceding subject matter of this paragraph characterizes example 34 of the present disclosure.

Use of releasable coupling assemblies (e.g., first releasable coupling assembly 110 and second releasable coupling assembly 120) as set forth above allows for the positioning of rigid tubes (e.g., first rigid tube 102, second rigid tube 104) in a desired position, and for reliably and accurately measuring the positioning to provide for improved accuracy in fabricating tubing runs for installation in installation volume 101, such as in an airplane. Use of rigid tubes (e.g., first rigid tube 102, second rigid tube 104) allows for stability and accuracy in modeling runs to be installed. Use of lockable adjustment assembly 130 allows for convenient and reliable securement of the components of modeling assembly 100 during positioning and/or measurement. Modeling assembly 100 may be adjusted and assembled within installation volume 101 to account for structures and component to be encountered by a tubing run, and measurements of modeling assembly 100 used to fabricate a tubing run to be installed within installation volume 101.

Referring generally to FIG. 1 and particularly to, e.g., FIGS. 2-3, at least one of first rigid tubes 102 is different from at least another one of first rigid tubes 102. The preceding subject matter of this paragraph characterizes example 35 of the present disclosure, wherein example 35 also includes the subject matter according to example 34, above.

Use of different tubes provides for flexibility and adaptability in modeling tubing runs. For example, rigid tubes may have different diameters and/or lengths. As another example, one or more rigid tubes may be telescoping or have an otherwise variable length, while others do not.

Referring generally to FIG. 1 and particularly to, e.g., FIGS. 2-3, first rigid tubes 102 are identical to each other. The preceding subject matter of this paragraph characterizes example 36 of the present disclosure, wherein example 36 also includes the subject matter according to example 34, above.

Use of identical first rigid tubes 102 provides for reduced numbers of different tube types, and elimination of potential confusion between different types of tubes.

Referring generally to FIG. 1 and particularly to, e.g., FIGS. 2-3, at least one of second rigid tubes 104 is different from at least another one of second rigid tubes 104. The preceding subject matter of this paragraph characterizes example 37 of the present disclosure, wherein example 37 also includes the subject matter according to any one of examples 34-36, above.

Use of different tubes provides for flexibility and adaptability in modeling tubing runs.

Referring generally to FIG. 1 and particularly to, e.g., FIGS. 2-3, at least one of first rigid tubes 102 is different from at least another one of second rigid tubes 104. The preceding subject matter of this paragraph characterizes example 38 of the present disclosure, wherein example 38 also includes the subject matter according to any one of examples 34-36, above.

Use of different tubes provides for flexibility and adaptability in modeling tubing runs.

Referring generally to FIG. 1 and particularly to, e.g., FIGS. 2-3, first rigid tubes 102 are identical to second rigid tubes 104. The preceding subject matter of this paragraph characterizes example 39 of the present disclosure, wherein example 39 also includes the subject matter according to example 34, above.

Use of identical first rigid tubes 102 and second rigid tubes 104 provides for reduced numbers of different tube types, and elimination of potential confusion between different types of tubes.

Referring generally to FIG. 1 and particularly to, e.g., FIGS. 2-3 and 14, at least one of first rigid tubes 102 or second rigid tubes 104 comprises telescoping assembly 180 having adjustable length 182. The preceding subject matter of this paragraph characterizes example 40 of the present disclosure, wherein example 40 also includes the subject matter according to any one of examples 34-39, above.

Use of telescoping assembly 180 allows for varying length of a rigid tube as well as orientation of two or more rigid tubes for convenient, accurate modeling of a tubing run within installation volume 101.

Examples of the present disclosure may be described in the context of aircraft manufacturing and service method 1100 as shown in FIG. 17 and aircraft 1102 as shown in FIG. 18. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 18, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A modeling assembly (100) for layout of rigid tubing, the modeling assembly (100) comprising:
    a first releasable coupling assembly (110), comprising a first female threaded member (116) and a first male threaded member (112) that has a first portion (113) and that is configured to be threaded into the first female threaded member 116;
    a second releasable coupling assembly (120), comprising a second female threaded member (126) and a second male threaded member (122) that has a first portion (123) and that is configured to be threaded into the second female threaded member (126); and
    a lockable adjustment assembly (130) comprising a first component (140) and a second component (150), wherein:
        the first component (140) of the lockable adjustment assembly (130) is configured to be removably coupled to an end A of a first rigid tube (102), having a first longitudinal axis (103), via the first releasable coupling assembly (110), the first component (140) comprising a spherical portion (143) and a first through opening (141) passing through the spherical portion (143) along the first longitudinal axis (103) of the first tube (102), wherein the first portion (113) of the first male threaded member (112) passes through the first through opening (141) of the first component (140) to be accepted by the first female threaded member (116),
        the second component (150) of the lockable adjustment assembly (130) is configured to be removably coupled to an end C of a second rigid tube (104), having a second longitudinal axis (105), via the second releasable coupling assembly (120), the second component (150) comprising a cavity (152) configured to accept the spherical portion (143) of the first component (140), the second component (150) comprising a second through opening (151) passing through the second component (150) along the second longitudinal axis (105) of the second rigid tube (104), wherein the first portion (123) of the second male threaded member (122) passes through the second through opening (151) of the second component (150) to be accepted by the second female threaded member (126),
        the lockable adjustment assembly (130) is selectively configured to a loose coupled state or a locked coupled state,
        with the lockable adjustment assembly (130) in the loose coupled state, the first component (140) of the lockable adjustment assembly (130) and the second component (150) of the lockable adjustment assembly (130) have only three degrees of freedom relative to each other; and
        with the lockable adjustment assembly (130) in the locked coupled state, the first component (140) of the lockable adjustment assembly (130) and the second component (150) of the lockable adjustment assembly (130) have zero degrees of freedom relative to each other.

2. The modeling assembly (100) according to claim 1, wherein the first releasable coupling assembly (110) comprises:
    a first expander (114) configured to be interposed between the first component (140) of the lockable adjustment assembly (130) and the first female threaded member (116), wherein the first expander (114) comprises a through central cavity (117); and
    wherein, when the first female threaded member (116) and the first expander (114) are positioned inside the first rigid tube (102), the first portion (113) of the first male threaded member (112) is inserted through the first component (140) of the lockable adjustment assembly (130), and the first male threaded member (112) is threaded into the first female threaded member (116) to compress the first expander (114) in an axial direction (129) along the first longitudinal axis (103) of the first rigid tube (102) between the first component (140) of the lockable adjustment assembly (130) and the first female threaded member (116), the first expander (114) expands in a radial direction (128), perpendicular to the first longitudinal axis (103) of the first rigid tube (102), to press against and frictionally engage a first interior surface (109) of the first rigid tube (102).

3. The modeling assembly (100) according to claim 2, wherein:
the first male threaded member (112) further comprises a second portion (111), and
the second portion (111) of the first male threaded member (112) is configured not to pass through the first through opening (141) of the first component (140).

4. The modeling assembly (100) according to claim 2, wherein:
the first female threaded member (116) comprises an extension (115) and a flange (119),
the extension (115) is configured to be accepted within the through central cavity (117) of the first expander (114) and to support at least a portion of the first expander (114) in the radial direction (128), and
the flange (119) is configured to axially compress the first expander (114) when the first portion (113) of the first male threaded member (112) is threaded into the first female threaded member (116).

5. The modeling assembly (100) according to claim 4, wherein the first releasable coupling assembly (110) further comprises a first washer (219) configured to be interposed between the first expander (114) and the flange (119) of the first female threaded member (116) of the first releasable coupling assembly (110).

6. The modeling assembly (100) according to claim 2, wherein the first releasable coupling assembly (110) further comprises a second washer (217) configured to be interposed between the first expander (114) and the first component (140) of the lockable adjustment assembly (130).

7. The modeling assembly (100) according to claim 1, wherein the second releasable coupling assembly (120) further comprises:
a second expander (124) configured to be interposed between the second component (150) of the lockable adjustment assembly (130) and the second female threaded member (126), wherein the second expander (124) comprises a through central cavity (118); and
wherein, when the second female threaded member (126) and the second expander (124) are positioned inside the second rigid tube (104), the first portion (123) of the second male threaded member (122) is inserted through the second component (150) of the lockable adjustment assembly (130), and the second male threaded member (122) is threaded into the second female threaded member (126) to compress the second expander (124) in an axial direction (131) along the second longitudinal axis (105) of the second rigid tube (104) between the second component (150) of the lockable adjustment assembly (130) and the second female threaded member (126), the second expander (124) expands in a radial direction (132), perpendicular to the second longitudinal axis (105) of the second rigid tube (104) to press against and frictionally engage a second interior surface (209) of the second rigid tube (104).

8. The modeling assembly (100) according to claim 7, wherein:
the second male threaded member (122) further comprises a second portion (121), and
the second portion (121) of the second male threaded member (122) is configured not to pass through the second through opening (151) of the second component (150).

9. The modeling assembly (100) according to claim 1, wherein:
the cavity (152) of the second component (150) is selectively configured to an expanded state, corresponding to the loose coupled state of the lockable adjustment assembly (130) or a contracted state, corresponding to the locked coupled state of the lockable adjustment assembly (130);
in the expanded state, the cavity (152) of the second component (150) is configured to be loosely coupled with the spherical portion (143) of the first component (140); and
in the contracted state, the cavity (152) of the second component (150) is configured to fixedly retain the spherical portion (143) of the first component (140).

10. The modeling assembly (100) according to claim 9, wherein:
the second component (150) comprises fingers (153) and notches (154) formed between the fingers (153),
each of the notches (154) has a width (156),
the width (156) of the notches (154) decreases when the cavity (152) of the second component (150) is configured from the expanded state to the contracted state, and
the width (156) of the notches (154) increases when the cavity (152) of the second component (150) is configured from the contracted state to the expanded state.

11. The modeling assembly (100) according to claim 10, wherein:
the second component (150) further comprises a neck (158); and
the lockable adjustment assembly (130) further comprises a threaded nut (159) configured to progressively threadably engage the neck (158) of the second component (150) to configure the cavity (152) of the second component (150) to the contracted state or to progressively threadably disengage the neck (158) of the second component (150) to configure the cavity (152) of the second component (150) to the expanded state.

12. The modeling assembly (100) according to claim 11, wherein the neck (158) of the second component (150) is tapered.

13. The modeling assembly (100) according to claim 10 wherein:
the first component (140) of the lockable adjustment assembly (130) further comprises a neck (142), and
at least one of the fingers (153) of the second component (150) comprises a relief cutout (157) configured to clear the neck (142) of the first component (140).

14. The modeling assembly (100) according to claim 1, wherein the first component (140) of the lockable adjustment assembly (130) comprises markings (190) configured to indicate an orientation of the first rigid tube (102) with respect to the second rigid tube (104).

15. The modeling assembly (100) according to claim 1, wherein the first component (140) of the lockable adjustment assembly (130) comprises at least one marking (162) indicating a center of the lockable adjustment assembly (130).

16. The modeling assembly (100) according to claim 1, wherein the lockable adjustment assembly (130) further comprises a position sensor (160).

17. The modeling assembly (100) according to claim 16, wherein the position sensor (160) is coupled to one of the first component (140) or the second component (150).

18. A modeling assembly (100) for layout of rigid tubing, the modeling assembly (100) comprising:
first rigid tubes (102), each having an end A and an end B;
second rigid tubes (104), each having an end C and an end D;

first releasable coupling assemblies (110), each comprising a female threaded member (116) and a first male threaded member (112) that has a first portion (113) and that is configured to be threaded into the first female threaded member (116);

second releasable coupling assemblies (120), each comprising a second female threaded member (126) and a second male threaded member (122) that has a first portion (123) and that is configured to be threaded into the second female threaded member (126); and lockable adjustment assemblies (130) each comprising a first component (140) and a second component (150), wherein:

the first component (140) of each one of the lockable adjustment assemblies (130) is configured to be removably coupled to the end A or the end B of one of the first rigid tubes (102) via one of the first releasable coupling assemblies (110), wherein the first component (140) comprises a spherical portion (143) and a first through opening (141) passing through the spherical portion (143) along a first longitudinal axis (103) of the one of the first rigid tubes (102), wherein the first portion (113) of the first male threaded member (112) passes through the first through, opening (141) of the first component (140) to be accepted by the first female threaded member (116), the second component (150) of each one of the lockable adjustment assemblies (130) is configured to be removably coupled to one of the end C or the end D of one of the second rigid tubes (104) via one of the second releasable coupling assemblies (120), wherein the second component (150) comprises a cavity (152) configured to accept the spherical portion (143) of the first component (140), the second component (150) comprising a second through opening (151) passing through the second component (150) along a second longitudinal axis (105) of the one of the second rigid tubes (104), wherein the first portion (123) of the second male threaded member (122) passes through the second through opening (151) of the second component (150) to be accepted by the second female threaded member (126), each one of the lockable adjustment assemblies (130) is selectively configured to a loose coupled state or a locked coupled state, with one of the lockable adjustment assemblies (130) in the loose coupled state, the first component (140) of the one of the lockable adjustment assemblies (130) and the second component (150) of the one of the lockable adjustment assemblies (130) have only three degrees of freedom relative to each other; and with one of the lockable adjustment assemblies (130) in the locked coupled state, the first component (140) of the one of the lockable adjustment assemblies (130) and the second component (150) of the one of the lockable adjustment assemblies (130) have zero degrees of freedom relative to each other.

19. The modeling assembly (100) according to claim 18, wherein at least one of the first rigid tube (102) or the second rigid tube (104) comprises a telescoping assembly (180), wherein at least one of the first rigid tube (102) or the second rigid tube (104) has an adjustable length (182).

* * * * *